United States Patent
Inagaki et al.

(10) Patent No.: US 6,261,461 B1
(45) Date of Patent: Jul. 17, 2001

(54) METHOD FOR TREATING WASTE WATER WITH A POLYMER AGGREGATING AGENT

(75) Inventors: Yasuhito Inagaki; Tsutomu Noguchi; Haruo Watanabe; Miyuki Kuromiya, all of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/444,808

(22) Filed: Nov. 22, 1999

Related U.S. Application Data

(62) Division of application No. 09/070,354, filed on Apr. 30, 1998, now abandoned, which is a division of application No. 08/889,181, filed on Jul. 7, 1997, now Pat. No. 6,086,783.

(30) Foreign Application Priority Data

Jul. 8, 1996 (JP) .................................................. 8-177813
Jul. 8, 1996 (JP) .................................................. 8-177814
Sep. 27, 1996 (JP) ................................................ 8-256383

(51) Int. Cl.$^7$ ...................................................... C02F 1/56
(52) U.S. Cl. ........................... 210/728; 210/727; 210/732; 210/733; 210/734
(58) Field of Search ................................ 210/666, 691, 210/702, 725, 726, 727, 728, 732, 733, 734, 778, 714

(56) References Cited

U.S. PATENT DOCUMENTS

| | | | |
|---|---|---|---|
| 2,764,576 | 9/1956 | Blaser et al. | 260/79.3 |
| 3,259,570 * | 7/1966 | Priesing et al. | 210/727 |
| 3,300,407 * | 1/1967 | Priesing et al. | 210/727 |
| 3,377,274 * | 4/1968 | Burke et al. | 210/727 |
| 3,503,946 | 3/1970 | Scanley | 260/89.7 |
| 3,551,393 | 12/1970 | Muzyczko et al. | 260/79.3 |
| 3,696,058 | 10/1972 | Teti | 260/2.3 |
| 3,996,131 * | 12/1976 | Conn | 210/638 |
| 4,009,706 | 3/1977 | Shaughnessey | 127/48 |
| 4,077,923 | 3/1978 | Tanaka et al. | 260/2.3 |
| 4,196,105 | 4/1980 | Kubát et al. | 260/2.3 |
| 4,557,859 | 12/1985 | Maeda et al. | 252/511 |
| 4,597,794 | 7/1986 | Ohta et al. | 106/20 |
| 4,686,047 * | 8/1987 | Arots | 210/712 |
| 4,702,263 | 10/1987 | Mintz et al. | 210/728 |
| 4,765,923 | 8/1988 | Walterick, Jr. | 252/181 |
| 4,880,857 | 11/1989 | Mori et al. | 523/205 |
| 5,071,587 | 12/1991 | Perman | 252/181 |
| 5,133,870 * | 7/1992 | Heidenreich | 210/712 |
| 5,143,624 * | 9/1992 | Morse | 210/712 |
| 5,227,421 | 7/1993 | Kageyama et al. | 524/449 |
| 5,397,391 | 3/1995 | Stramel | 106/447 |
| 5,453,205 | 9/1995 | Browne | 210/708 |
| 5,725,780 | 3/1998 | Carpenter et al. | 210/728 |
| 6,022,928 * | 2/2000 | Inagaki et al. | 525/332.9 |

FOREIGN PATENT DOCUMENTS

| | | |
|---|---|---|
| 3221451 | 8/1983 | (DE) . |
| 0 096 244 A2 | 12/1983 | (EP) . |
| 967607 | 8/1964 | (GB) . |
| 62-590 | 1/1987 | (JP) . |

OTHER PUBLICATIONS

Database WPI Section Ch., Week 8706 Derwent Publications Ltd., London, GB; AN 87–041019 XP002043013 & JP 62 000 590 A (Lion Corp), Jan. 6, 1987 Abstract.

Database WPI Section Ch., Week 9111 Derwent Publications Ltd., London, GB; AN 91–078475 XP002043015 & JP 03 026 731 A (Sanyo Chem Ind Ltd), Feb. 5, 1991 Abstract.

Database WPI Section Ch, Week 8922 Derwent Publications Ltd., London, GB; AN 89–161791 XP002043015 & JP 01 104 335 A (Lion Corp), Apr. 21, 1989 Abstract.

* cited by examiner

*Primary Examiner*—Peter A. Hruskoci
(74) *Attorney, Agent, or Firm*—Sonnenschein, Nath & Rosenthal

(57) ABSTRACT

A polymer electrolyte which contains an inorganic pigment, having a sulfonated polystyrene resin as a principal ingredient, and is soluble to water.

17 Claims, No Drawings

METHOD FOR TREATING WASTE WATER WITH A POLYMER AGGREGATING AGENT

This is a division of application Ser. No. 09/070,354, filed Apr. 30, 1998, now abandoned which, in turn, is a division of application Ser. No. 08/889,181, filed Jul. 7, 1997, now U.S. Pat. No. 6,086,783.

BACKGROUND OF THE INVENTION

1. Field of the Invention

This invention relates to a polymer electrolyte which includes a sulfonated polystyrene resin, further to a polymer aggregating agent and a disposal of waste water.

2. Description of Prior Art

Styrene, $C_6H_5CH:CH_2$, is a colorless oily liquid that my serve as the monomer for polystyrene. As a polymer of styrene, the polystyrene resin is transparent, and is excellent in electric properties, rigidity, and resistance to water. In addition, it requires less cost for production. Accordingly, the polystyrene resin is used alone, or as copolymers and alloys in combination with other resins to serve as a material of buffering members (foamed styrol), packing materials, or cabinets and parts of electric appliances and automobiles, and has been used as widely as polyolefin resins represented by polyethylene.

The polystyrene resin is used not only as a structural element as described above, but can be used, for example, as an agglutinating agent after it has been converted to a polymer electrolyte.

Recently, a world-wide attention has been directed to protection of natural environment, and preservation of clean water resources is thought as a key to the problem. Under these circumstances, legal regulations controlling liquid waste discharged from plants and general households as specified in the sewage control law are becoming more strict.

To control waste water, recourse has been made to purification by a variety of polymer aggregating agents. The polymer aggregating agent widely used includes non-ionic/anion types for industrial water wastes, and cationic types for general sewage and human excretions. Although these aggregating agents are chosen as appropriate according to a given application, which require properties that enable the agent to clean liquid waste, concentrate it and remove water content from it. Of these properties, the cleaning activity of a suspension is most important, and demand for that activity has been increasingly strengthened from the viewpoint to protect environment from pollution because the filtrate produced after sewage has been treated with an aggregating agents discharged into rivers, lakes and the sea in local areas.

Under these circumstances, trials have been made in which two kinds of polymer aggregating agents are combined or a polymer aggregating agent is combined with a metal compound, to give a product capable of reducing the chemical oxygen demand (COD) and turbidity of a filtrate.

However, conventional technologies have not produced yet any aggregating agents that can satisfactorily clean a suspension, and improvement of conventional technologies involved in water treatment has been desired.

OBJECTS AND SUMMARY OF THE INVENTION

This invention intends to provide a polymer electrolyte which dissolves sufficiently readily into water.

In addition, this invention intends to provide a polymer aggregating agent which is highly potent in purifying a suspension, and to provide further a liquid waste disposal which is highly effective for the purification of a suspension.

Furthermore, this invention intends to provide a polymer aggregating agent which is highly potent in purifying a suspension and can reduce the water content of produced cakes.

DETAILED DESCRIPTION OF THE PREFERRED EMBODIMENTS

The polymer electrolyte of this invention contains a sulfonated polystyrene resin as a principal ingredient, in addition to an inorganic pigment, and is water soluble.

The presence of the inorganic pigment, during sulfonation of the polystyrene resin, inhibits cross-linking reactions, thereby suppressing gelation of the product. Through this maneuver, unnecessary polymers are not generated in water, and water-soluble polymer electrolytes can be stably obtained.

The polymer aggregating agent of this invention contains a polymer compound as a principal ingredient, and, in addition, carbon black. The liquid waste disposal this invention provides consists of adding the polymer aggregating agent to liquid waste, aggregating suspended matters, and removing the aggregated matters by filtration.

Use of a polymer aggregating agent supplemented with carbon black or use of a polymer aggregating agent together with carbon black will enhance the purification activity of that agent towards a suspension.

The polymer aggregating agent of this invention contains a sulfonated styrene polymer as a principal ingredient and has a molecular weight of 150,000–600,000.

Use of a styrene polymer having a comparatively large molecular weight will enhance the purification activity of the product towards a suspension, and reduce the water content of resulting cakes.

The polymer electrolyte of this invention contains, in addition to an inorganic pigment, a sulfonated polystyrene resin as a principal ingredient, and is water soluble.

The inorganic pigment may include either carbon black or titanium oxide, or both, and the content may be $1 \times 10^{-5}$–15 wt %, or more preferably $5 \times 10^{-4}$–5 wt %.

Carbon black and titanium oxide can be chosen from any general products that are used as a colorant of resins, a reinforcing agent or an agent conferring electroconductivity. For example, carbon black can be chosen from any products that have been produced by a channel method, furnace method or thermal method.

A carbon black product which has been produced by any one of those methods may be used, or carbon black products which have been produced by different methods may be used in combination. It preferably has an average particle size of 5–500 nm, or more preferably 10–50 nm. Titanium oxide may have a rutile, anatase, or ultra-fine structure. Titanium oxide with any one structure may be used or titanium oxide crystals with different structures may be used in combination. It preferably has an average particle size of 0.01–50 nm, or more preferably 0.05–10 nm.

The polystyrene resin may consist of a single polystyrene compound, or a copolymer of a styrene with other monomers. When the polystyrene resin consists of a copolymer, the styrene unit preferably occupies 30 mol % or more. The polystyrene resin may be alloys or blends which result after the styrene unit has been combined with other polymers. In this case, the polystyrene resin preferably occupies 20 wt % or more of the total product.

The styrene copolymer may include styrene-butadiene, styrene-acrylonitrile, styrene-butadiene-acrylonitrile, styrene-(metha)acrylate (aliphatic hydrocarbons with 1–4 carbons), styrene-acrylonitrile-(metha)-acrylate esters (aliphatic hydrocarbons with 1–4 carbons), styrene-butadiene-(metha) acrylate ester (aliphatic hydrocarbons with 1–4 carbons), styrene-anhydrous maleate, and styrene-an hydrous itaconic acid. Of them preferred are styrene-butadiere, styrene-acrylonitrile, styrene-butadiene-acrylonitrile, styrene-acrylonitrile-(metha)acrylate esters (aliphatic hydrocarbons with 1–4 carbons), and styrene-butadiene-(metha)-acrylate esters (aliphatic hydrocarbons with 1–4 carbons), and styrene-a nhydrous maleate. Of them, styrene-butadiene, styrene-acrylonitrile, styrene-butadiene-acrylonitrile, and styrene-anhydrous maleate are particularly preferred. These styrene copolymers may be used alone or incombination with polystyrene or other styrene copolymers. The polystyrene resin preferably has a molecular weight of 5,000–10,000,000, more preferably 50,000–100,000, or further more preferably 100,000–500,000.

When the polystyrene resin is made into an alloy, or used as a blend, other polymers to be combined with the alloy or blend may include polyphenylene ether, polycarbonate, polyphenylene sulfide, polyamide (nylon), polyethylenetelephthalate, and polybutylenetelephthalate. Of them particularly preferred are polyphenylene ether and polycarbonate. Any one of them may be used alone, or two or more of them may be used in combination.

The above-described polymer electrolytes can be used as an aggregating agent for the treatment of liquid waste, dispersant for cement production, thinning agent for paper production, electroconductive agent for copying machines, and anti-static electricity agent. They are particularly well suited for the treatment of liquid waste, dispersal of cement particles, thinning of paper fibers and electroconduction of the toner particles of copying machines.

The manufacture of the polymer electrolyte of this invention is to produce the polymer electrolytes as described above, and consists of converting a polystyrene resin into a water-soluble polymer electrolyte by sulfonating the resin in the presence of an inorganic pigment.

The polystyrene resin may be chosen from among those described above, and can be also adopted from a new material (virgin material) specially prepared for the production of the polymer electrolyte of this invention, or from wastes (waste materials) from plants, shops and households. Or, a combination of virgin and waste materials may be used. As seen from above, this invention can recycle polystyrene resins which have been mass-produced as a general-purposeres in and wasted, and hence is very beneficial for the protection of global environment from artificial pollutants. From this point of view, it is desirable for this invention to adopt waste materials as a source of polystyrene resins rather than virgin materials. As a source of polystyrene resins, it is desirable to resort to wastes from plants and shops than those from general households, because the wastes from plants and shops may be more or less homogenous in composition.

Prior to sulfonation, the polystyrene resin is dissolved in an organic solvent, or dispersed there, to which is added a sulfonating agent. When a polystyrene resin is used in combination with another polymer, the two compounds are dissolved or dispersed in an organic solvent.

The organic solvent preferably includes halogenated aliphatic hydrocarbons with 1–2 carbons, particularly 1,2-dichloromethane, chloroform, dichloromethane, and 1,1-dichloroethane. To this organic solvent is preferably added the polystyrene resin at 0.5–50 wt %, or more preferably 2–20 wt %, though the addition is more or less dependent on the molecular weight of the resin.

Saturated or unsaturated cyclic hydrocarbon compounds may be used. The saturated cyclic hydrocarbon compound may include cyclopenthane, methylcyclopenthane, cyclohexane, methylcyclohexane, ethylcyclohexane, p-menthane, bicyclohexyl, dekalin, sabinane, etc. The unsaturated cyclic hydrocarbon compound may include cyclohexane, monocyclic monoterpene (limonene, sylvestrene, and terpinene), dicyclic monoterpene (carene, pinene, sabinene, and camphene), and terpinorene. Of these cyclic hydrocarbons, saturated cyclic hydrocarbons are more preferred.

The solvent which can coexist with such a cyclic hydrocarbon may include, in addition to above-described aliphatic hydrocarbons, paraffin hydrocarbons with 1–7 carbons, acetonitrile, carbondisulfide, tetrahydroflan, tetrahydrobilan, acetone, methylethylketone, thiophene, etc. Of them particularly preferred are paraffin hydrocarbons, acetonitrile, tetrahydroflan, and acetone.

The sulfonating agent may include anhydrous sulfuric acid, fuming sulfuric acid, chlorosulfonic acid, and concentrated sulfuric acid. The addition of the sulfonating agent is preferably set to 0.5–2.0 mol for every benzenering in the branched chain of the polystyrene resin, or preferably 0.7–1.5 mol. When a polyphenylene ether or polycarbonate resin is used in combination, benzene rings in the backbone of this resin and benzene rings in the above-described polystyrene resin should be taken into account, to determine the amount of the sulfonating agent to be added. If addition of the sulfonating agent is too little, the product would be insufficiently sulfonated and its solubility to water would be also insufficient. On the contrary, if addition of the sulfonating agent is too much, cross-linking reactions within and among molecules would be enhanced, which would lead to increased production of by-products, and solubility of the product to water would be also impaired.

The sulfonating agent may be used in combination with a Lewis base. In this case, the Lewis base may include alkyl phosphates such as triethylphosphate and trimethylphosphate, dioxane, anhydrous acetic acid, ethyl acetate, diethylether, thioxane, etc.

The sulfonating reaction preferably takes place at 0–80° C., or more preferably at 10–60° C.

It is important to allow either carbon black or titanium oxide or other inorganic pigments to coexist during the sulfonation. During the sulfonation, either carbon black or titanium oxide, or both are preferably allowed to exist at a concentration of $1 \times 10^{-5}$–25 wt %, or more preferably at $5 \times 10^{-4}$–10 wt %.

The inorganic pigment may be added to the reaction system prior to sulfonation so that it can coexist during sulfonation occurring subsequently, or inorganic pigment remains in the polystyrene resin may be used instead. Typically, polystyrene resin waste contains carbon black or titanium oxide as an additive, and when the content satisfies the above-described requirement, the polystyrene resin waste can undergo sulfonation without any deliberate addition of an inorganic pigment. The resin supplemented previously with an inorganic pigment disperses more readily in a reaction system. The resin supplemented with an inorganic pigment in advance preferably contains the pigment at 0.002–50 wt %, particularly at 0.01–10 wt %.

When an inorganic solvent is allowed to coexist during the sulfonation of a polystyrene resin as described above, it improves the dispersibility of the resin so that reaction proceeds evenly. This inhibits cross-linking reactions within and among involved molecules, thereby suppressing the production of by-products insoluble to water. Thus, presence of an inorganic solvent in the reaction system ensures stable production of water-soluble polymer electrolytes, improves the dispersibility of polymer electrolytes, and allows stable production of polymer electrolytes even in quality.

The reaction system, after sulfonation as described above, is allowed to react with a basic compound to be neutralized. The basic compound may include hydroxides and carbonates of alkali metals and alkali earth metals, ammonia, and primary to tertiary alkyl amine compounds. It may be added neat or as a solution gradually until the system is completely neutralized. When it is added as an aqueous solution, its addition varies according to the molecular weight of the polystyrene resin, but preferably is 1–100 times, or more preferably 2–5, times the total weight of the resin. When the neutralization reaction is completed, the solvent may be removed by fractional distillation or evaporation.

Above procedures produce a water-soluble polymer electrolyte containing an inorganic pigment. Although generally the polymer electrolyte containing an inorganic pigment is excellent in its homogeneous dispersibility when dissolved in water, it may be removed of the inorganic pigment by filtration as needed.

In addition, this invention enables disposal of liquid waste by utilizing the polymer electrolyte containing carbon black as an aggregating agent, or by utilizing the polymer aggregating agent in combination with carbon black.

Carbon black to be used in this invention may include the products generally used as a coloring agent or a reinforcing agent of resins, or as a conductivity-conferring agent. Carbon black can be chosen from any products that have been produced by a channel method, furnace method or thermal method. A carbon black product which has been produced by any one of those methods may be used alone, or carbon black products which have been produced by different methods may be used in combination. It preferably has an average particle size of 5–500 nm, or more preferably 10–50 nm.

When carbon black is placed in waste water, minute particles and organic elements suspending in the water cluster together around carbon black particles as nuclei, to form aggregates. These tiny aggregates, thanks to the polymer aggregating agent, cluster further together to form larger aggregates, which are then removed by filtration. This will result in reduction of the turbidity and COD of the filtrate.

In above procedure, whether carbon black is added after having been combined with the polymer aggregating agent, or it is added independently of the polymer aggregating agent, the resulting effect will be the same. However, it is preferable for carbon black to be combined with the polymer aggregating agent prior to use, because then the polymer aggregating agent will disperse more evenly in waste water, and require no complicated processes as would be necessary if these agents were added separately.

If they are added separately, any one of the two may come first, but it is more preferable to add carbon black first.

When carbon black is combined with the polymer aggregating agent, its addition is preferably set to 0.01–20 wt %, or more preferably 0.05–10 wt % with respect to the polymer content of the polymer aggregating agent. When carbon black is added independently of the polymer aggregating agent to waste water, its added amount is typically 0.005–1000 ppm, or preferably 0.01–200 ppm, although the amount may be adjusted more or less according to the concentration of suspended particles (SS) in the water. If the added amount is too little, the filtrate, even after being removed of aggregates, will still hold a considerable fraction of turbidity and COD. On the contrary, if the added amount is too much, carbon black will remain in the filtrate, or interfere with aggregation of suspended particles.

The polymer compound constituting the polymer aggregating agent may include sulfonates of polystyrene resins, non-ionic or anionic acrylamide resins, or cationic resins. They may be used alone or in combination. Non-ionic, anionic and cationic polymer aggregating agents appropriate for this invention will be given for illustration.

<Non-ionic Polymer Aggregating Agents>

They may include polyacrylamide and polymethacrylamide, and preferably polyacrylamide.

<Anionic Polymer Aggregating Agents>

They may include (metha)acrylate resins such as polyacrylamide and polymethacrylamide having undergone partial hydrolysis, copolymers of an acrylic acid or methacrylic acid with acrylamide or methacrylamide, or their salts, and triple copolymers of an acrylic acid or methacrylic acid with acrylamide or methacrylamide, and 2-acrylamide-methylpropane sulfonic acid or vinylsulfonic acid, and their salts.

Preferred are polyacrylamide having undergone partial hydrolysis, copolymers of an acrylic acid with acrylamide and their salts, and triple copolymers of an acrylic acid with acrylamide and 2-acrylamide-methylpropane sulfonic acid, and their salts.

The polystyrene sulfonate polymer may include polystyrene, styrenebutadiene, styrene-acrilonitrile, styrene-butadiene-acrilonitrile, styrene-(metha)acrylate, styrene-(metha)acrylate ester (aliphatic hydrocarbons with 1–4 carbons), styrene-butadiene-(metha)acrylate ester (aliphatic hydrocarbons with 1–4 carbons), styrene-anhydrous maleic acid, and styrene-anhydrous itaconic acid.

The polystyrene sulfonate polymer may include polystyrene, styrene-butadiene, styrene-acrylonitrile, styrene-butadiene-acrylonitrile, styrene-(metha)acrylate, styrene-(metha)acrylate esters (aliphatic hydrocarbons with 1–4 carbons), styrene-butadiene-(metha)acrylate esters (aliphatic hydrocarbons with 1–4 carbons), styrene-anhydrous maleate, and styrene-anhydrous itaconic acid. Of them preferred are polystyrene, styrene-butadiene, styrene-acrilonitrile, styrene-butadiene, and styrene-anhydrous maleic acid.

Other polymers may include polyphenylene ether, polycarbonate, polyphenylene sulfide, and polyethylenetelephthalate, and of there preferably polyphenylene ether and polycarbonate.

The anionic polymer aggregating agent can be prepared by recycling polystyrene resins which are mass-produced as a general-purpose resin material for many products, and hence can incorporate conveniently sulfonates of polystyrene resins.

<Cationic Polymer Aggregating Agents>

Preferred are polymers of the quaternary compound of dialkylaminoalkyl(metha)acrylate (for example, with methyl chloride, benzyl chloride, etc.) or its salts (inorganic salts such as chlorinates, sulfates, etc., and organic salts such as acetates, etc.) or their compolymers with (metha)acrylamide.

For example, polymers of the Quaternary compound of dimethylaminoetheracrylate with methylchloride, or their copolymers with acrylamide are preferred Polymers of the quaternary compound of dialkylaminoalkyl(metha)acrylamide or their acidic salts, or their copolymers with (metha)acrylamide are preferred.

For example, copolymers of the quaternary compound of dimethylaminopropylacrylamide incorporating methylchloride, with acrylamide are preferred.

Compounds which are produced after polyacrylamide has been made to have a cationic activity, and they include, for example, those that are produced after polyacrylamide has undergone Mannig's degeneration or Hoffman's decomposition.

Compounds which are produced after epihalohydrine-amine has been condensed, and they include, for example, a polymerized condensate between ephihalohydrine and alkylene diamine with 2–8 carbons.

Polydimethyldialylammonium chloride

Condensates of dicyandiamide, and they include, for example, formalin condensates of dicyandiamide and ammonium chloride.

Polyethylene imine

Polyvinylimizazoline

Acid salts of chitosan

The cationic polymer aggregating agent preferably includes polymers of the quaternary compounds of dialkylaminoalkyl (metha)acrylate or their acid salts, and their copolymers with (metha)acrylamide, polymers of the quaternary compounds of dialkylaminoalkyl(metha)acrylamide or their acid salts, or their copolymers with (metha)acrylamide, and acid salts of chitosan.

A plurality of polymer aggregating agents with the same ionic type may be combined, or a plurality of polymer aggregating agents with a combination of anionic and non-ionic activities, or with a cationic and non-ionic combination may be used.

The polystyrene resin may be chosen from new materials (virgin material) specially prepared for the production of polymer electrolytes of this invention, or from wastes (waste materials) from plants, shops and households. Or, a combination of virgin and waste materials may be used. As seen from above, this invention can recycle polystyrene which has been mass-produced as a general-purpose resin, and hence is very beneficial for the protection of global environment from artificial pollutants. From this point of view, it is desirable for this invention to adopt waste materials as a source of polystyrene resins rather than virgin materials. Since many of waste polystyrene resin materials contain carbon black, and Will provide, when the polystyrene resin has been converted to a sulfonate, an aggregating agent containing a sufficient amount of carbon black.

For a polystyrene resin to be sulfonated, it is only necessary to dissolve or disperse the polystyrene resin in an organic solvent, and to add a sulfonating agent to the solution. The solution, after sulfonation, is neutralized through reaction with a basic compound, and the solvent is removed by fractional distillation or by evaporation. The solvent preferably includes aliphatic halogenated hydrocarbons with 1–4 carbons represented by 1,2-dichlorohexane, and aliphatic, cyclic compounds represented by cyclohexane.

This invention may recycle polymer electrolytes which contain a sulfonated styrene polymer as a principal ingredient, and whose molecular weight is 150,000 to 600,000.

The polystyrene resin used for this purpose may be chosen from new materials (virgin material) specially prepared for the production of polymer electrolytes of this invention, or from wastes (waste materials) from plants, shops and households. Or, a combination of virgin and waste materials may be used. This invention can recycle polystyrene which has been mass-produced as a general-purpose resin, and hence is very beneficial for the protection of global environment from artificial pollutants. From this point of view, it is desirable for this invention to adopt waste materials as a source of polystyrene rather than virgin materials.

The above-described polymer aggregating agent can be obtained by allowing specified amounts of styrene polymer, sulfonating agent and solvent to mix and undergo sulfonating reaction.

For this sulfonating reaction, addition of the styrene polymer is preferably set to 0.1–30 wt %, or more preferably to 0.5–20 wt %. If the styrene polymer is allowed to have a concentration lower than above range, it will be difficult to introduce sulfone group into the styrene polymer. On the contrary, if the styrene polymer is adjusted to have a concentration exceeding above range, gels will readily develop during sulfonation, or a large fraction of polymer will remain unreacted.

Sulfonation reaction is preferably allowed to proceed at 0–100° C., or more preferably at 15–80° C. If the reaction temperature is set below this range, sulfonation will hardly take place, and the yield of polymer aggregating agent will be reduced.

Further, the sulfonating reaction is allowed to take 10 minute to 10 hours, more preferably 30 minutes to 5 hours (the time required for dropwise addition of the sulfonating agent is not included).

The solution, after having completed sulfonation in the manner as described above, has sulfone group neutralized by the addition of a neutralizing agent, and is removed of its solvent through evaporation, to produce the target polymer aggregating agent.

The neutralizing agent may include oxides, hydroxides, carbonates, acetates, sulfates and phosphates of basic compounds such as alkali metals (sodium, lithium, potassium, etc.) and of alkali earth metals (magnesium, calcium, etc.), ammonia, and various (primary to tertiary alkyl) amine compounds. The neutralizing agent may be slowly added as a solid or an aqueous solution to the reaction system, to neutralize sulfone group introduced into the styrene polymer. Removal of the solvent may take place through fractional distillation or evaporation.

The thus-obtained polymer aggregating agent must have a molecular weight of 150,000 to 600,000, or more preferably 200,000 to 500,000. The polymer aggregating agent of which the sulfonated styrene polymer has a molecular weight less than 150,000 will lose the activity to aggregate suspended particles in a suspension, and rather disperse those suspended matters into the solvent. On the contrary, if the sulfonated styrene polymer has a molecular weight of 600,000 or more, it will cause suspended particles to aggregate into coarse masses, not being able to purify water sufficiently, and the resulting cake will contain too much water.

For this polymer aggregating agent, 40 mol % or more, or preferably 50 mol % or more sulfone group is introduced into the styrene polymer. The polymer aggregating agent, of which the styrene polymer contains 40 mol % or less sulfone group, p become less soluble to water, and thus greatly lose the aggregating activity towards suspended matters in a suspension.

As discussed above, for the desired amount of sulfone group to be introduced into the styrene polymer to produce a proper polymer aggregating agent, the styrene unit preferably occupies 60 mol %, or more preferably 80 mol % or more of the styrene polymer. If the fraction of styrene unit in the styrene polymer were less than 60 mol %, it would be difficult to obtain a polymer aggregating agent in which the desired amount of sulfone group can be introduced through sulfonation.

The thus-obtained polymer aggregating agent may be used in combination with another aggregating agent consisting of acrylamide polymer with non-ionic and/or anionic activity, for the treatment of waste water. The agent in question may be used in combination with another aggregating agent with cationic activity as well.

Any one of non-ionic, anionic, or cationic polymer aggregating agents that have been cited above may be used.

The polymer aggregating agent, when used in combination with another aggregating agent, may be combined with the latter prior to use, or may be added separately during use. Particularly, when it is used in combination with a cationic polymer aggregating agent, it is preferably added separately during use.

Polymer Electrolyte Containing an Inorganic Substance

A resin was prepared by grinding following substances with a milling machine.

(a) Polystyrene

Aldrich, molecular weight (MW)=280,000 (free from inorganic pigments)

(b) High impact polystyrene housing material for VHS cassette tapes (containing 1 wt % carbon black)

(c) High impact polystyrene: alloy with polyphenyleneether housing material of facsimile machines (containing 2 wt % titanium oxide)

(d) Polystyrene: alloy with polyphenyleneether housing material of CD-ROM drives (containing 2 wt % carbon black)

EXAMPLE 1

Sixty gram of polystyrene (a) was dissolved in 540 g of 1,2-dichloroethane, to which was added 0.5 g of carbon black (a standard product for coloration, HCC type, having an average particle size of 9–14 nm). The mixture was heated to 50° C., to which was dropwise added 77 g of 60% fuming sulfuric acid over 30 minutes.

A slurry product developed in the reaction system, but there was no gel adherence on the wall of the reaction vessel throughout the reaction process.

After dropwise addition, for further 30 minutes, the mixture was kept at the same temperature for sulfonation, and while the reaction proceeded an aqueous solution of sodium hydroxide was added for neutralization. Then, the mixture was heated to remove 1,2-dichloroethane through evaporation, and the residue was dissolved in water, which was then adjusted with sodium hydroxide to give pH 8. This procedure gave a 20 wt % aqueous solution of the polymer electrolyte.

The thus obtained aqueous solution of the polymer electrolyte was allowed to stand at room temperature for one month, and still held a good homogenous dispersibility.

EXAMPLE 2

A solution was produced after 6.93 g of high impact polystyrene (b) was dissolved in 63 g of 1,2-dichloroethane. The first solution and 9.33 g of 60% fuming sulfuric acid were simultaneously added dropwise over 60 minutes to a solution which was produced after 2.44 g of triethylphosphate had been added to 70 g of 1,2-dichloroethane. During dropwise addition, the reaction system was controlled to be in the range of 20–25° C.

Carbon black contained in the high impact polystyrene (b) dispersed evenly in the reaction system, and produced stable, slurry compounds with the progression of sulfonation. In this example either, there was no adherence of gel substances to the wall of the reaction vessel.

After dropwise addition, for further 30 minutes, the mixture was kept at the same temperature for sulfonation, and, while the reaction proceeded, an aqueous solution of sodium hydroxide was added for neutralization. Then, the mixture was heated to remove 1,2-dichloroethane through evaporation, and the residue was dissolved in water to give a 20 wt % aqueous solution of the polymer electrolyte.

The thus obtained aqueous solution of the polymer electrolyte was allowed to stand at room temperature for one month, and still held a good homogenous dispersibility.

EXAMPLE 3

A solution produced after 0.6 g of triethyl phosphate had been added to 70 g of 1,2-dichloroethane, while being kept at 20–25° C., was added to 0.27 g of anhydrous sulfuric acid. A solution produced after 7.0 g of alloy (c) of high impact polystyrene-polyphenylene ether had been dissolved in 63 g of 1,2-dichloroethane, and 5.4 g of anhydrous sulfuric acid, while being kept at the same temperature, were simultaneously added dropwise over 60 minutes to the foregoing mixture.

Titanium oxide contained in the high impact polystyrene (c) dispersed evenly in the reaction system, and produced stable, slurry compounds with the progression of sulfonation. In this example either, there was no adherence of gel substances to the wall of the reaction vessel.

After dropwise addition, 32 g of an aqueous solution containing 3.0 g of sodium hydroxide was slowly added with stirring to the reaction system for neutralization. Then, the mixture was heated to remove the solvent through evaporation, the residue was dissolved in water, and the aqueous solution was adjusted by the addition of sodium hydroxide to give pH 8. This procedure produced an aqueous solution containing 30 wt % polymer electrolyte.

The thus obtained aqueous solution of the polymer electrolyte was allowed to stand at room temperature for one month, and still held a good homogenous dispersibility.

EXAMPLE 4

The same procedure was employed as in Example 3 except that an alloy (d) of polystyrene-polyphenylene ether was used instead of the alloy of high impact polystyrene-polyphenylene ether (c), to produce an aqueous solution of polymer electrolyte.

In this case too, carbon black contained in the alloy (d) of polystyrene-polyphenylene ether dispersed evenly in the reaction system, and produced stable, slurry compounds with the progression of sulfonation. In this example either, there was no adherence of gel substances to the wall of the reaction vessel.

The thus obtained aqueous solution of the polymer electrolyte was allowed to stand at room temperature for one

COMPARATIVE EXAMPLE 1

The same procedure was employed as in Example 1 except that carbon black was not added, to produce an aqueous solution of polymer electrolyte.

In this Comparative Example, about 10 minutes after dropwise addition of fuming sulfuric acid, a solid mass of gel substances developed in the reaction system, and, on completion of the dropwise addition, the gel substances adhered to the wall of the reaction vessel. In addition, these gel substances remained insoluble to water or alkaline aqueous solutions.

Evaluation of Performance

Comparison of Example 1 and Comparative Example 1 showed that the presence of carbon black inhibits the development of by-products insoluble to water while polystyrene is undergoing sulfonation.

Example 2 further revealed that waste materials derived from used polystyrene resins can provide a good yield of aqueous solution of polymer electrolyte, and that used polystyrene resins already contain a sufficient amount of carbon black.

Further, results from Examples 3 and 4 demonstrated that an alloy of polystyrene resin with another polymer can provide an aqueous solution of polymer electrolyte as good as that provided by a polystyrene resin alone.

Polymer Aggregating Agent containing Carbon Black

EXAMPLE 5

Twenty-five wt % aqueous solution of polystyrene sodium sulfate was prepared as a polymer aggregating agent, to which was added carbon black (for coloration of plastics, HCC type, having an average particle size of 9–14 nm) to 0.1 wt %, and allowed to disperse. This solution was made the sample of Example 5.

EXAMPLE 6

High impact polystyrene (used housing materials for VHS cassette tapes, containing 2 wt % carbon black) was dissolved in 1,2-dichloroethane, to which was added dropwise anhydrous sulfuric acid at 20–25° C. for sulfonation. Then an aqueous solution of sodium hydroxide having the same molar concentration with the anhydrous sulfuric acid was added for neutralization, and the solvent was removed by evaporation, to produce an aqueous solution of polymer aggregating agent containing 20 wt % polymer. This solution also contained 0.2 wt % carbon black. This was made the sample of Example 6.

EXAMPLE 7

An aqueous solution of 0.05 wt % partially hydrolyzed polyacrylamide was prepared as a polymer aggregating agent, to which was added carbon black similar to that in Example 5 to 0.005 wt %, and was allowed to disperse. This was made the sample of Example 7.

EXAMPLE 8

The sample of Example 5 and that of Example 7 were mixed at a volume ratio of 1:1. This was made the sample of Example 8.

EXAMPLE 9

A 0.2 wt % of aqueous solution of the quaternary compound of dimethylaminoethylmethacrylate with methylchloride was prepared, to which was added carbon black similar to that in Example 5, to 0.01 wt %, and allowed to disperse. This was made the sample of Example 9.

COMPARATIVE EXAMPLE 2

The same aqueous solution as in Example 5 was prepared except that carbon black was not added. Thus, an aqueous solution of 25 wt % polystyrene sodium sulfonate was made the sample of Comparative Example 2.

COMPARATIVE EXAMPLE 3

The same aqueous solution as in Example 7 was prepared except that carbon black was not added. Thus, an aqueous solution of 0.05 wt % partially hydrolyzed polyacrylamide was made the sample of Comparative Example 3.

COMPARATIVE EXAMPLE 4

The same aqueous solution as in Example 8 was prepared except that it did not contain carbon black. Thus, a 1:1 (in a volume ratio) mixture of the sample of Comparative Example 2 and that of Comparative Example 3 was made the sample of Comparative Example 4.

COMPARATIVE EXAMPLE 5

The same aqueous solution as in Example 9 was prepared except that carbon black was not added. Thus, an aqueous solution of 0.2 wt % polymer of the quaternary compound of dimethylaminoethylmethacrylate with methylchloride was made the sample of Comparative Example 5.

Evaluation of Performance

The above samples were submitted to following tests to evaluate their performance of treating waste water.

Firstly, waste water discharged from an electronic parts manufacturing plant (pH 3.2, having an SS concentration of 0.5 wt %, and having a COD concentration of 50 ppm) was sampled, to which was added 500 ppm of aluminum sulfate. The resulting suspension was made a test substrate with which to evaluate the performance of the samples. Hundred milliliter aliquots (100 ml) of the test substrate were placed in 200 ml volumetric cylinders with a cap. The samples from Examples 5–8 and Comparative Examples 2–4 were separately added to the test substrate to give a concentration of 5.0 ppm. Immediately thereafter the volumetric cylinder was stirred by being placed upside down and returned repeatedly ten times, and allowed to stand. While it was left to stand, the sedimentation rate of suspended particles, the turbidity of the filtrate after sedimentation, and the COD of the supernatant were determined. The results are shown in Table 1

TABLE 1

|  | Sedimentation rate (m/hour) | Turbidity (ppm) | COD (ppm) |
|---|---|---|---|
| Example 5 | 23 | 40 | 11 |
| Example 6 | 22 | 35 | 10 |
| Example 7 | 25 | 63 | 14 |
| Example 8 | 25 | 38 |  |
| Comparative Example 2 | 22 | 73 | 17 |
| Comparative Example 3 | 20 | 80 | 23 |
| Comparative Example 4 | 24 | 70 | 18 |

From Table 1 it is obvious that all the samples from Example 5–8 have a basic property as a polymer aggregating agent, and are especially more active in reducing the turbidity of the filtrate after sedimentation than the samples from Comparative Examples 2–4 which contained no carbon black.

Above results demonstrate that a polymer aggregating agent, when combined with carbon black, becomes greatly improved in its treatment activity towards waste water, particularly in its purifying activity towards suspensions. It was also found that the polymer aggregating agent may include polyethylene sodium sulfonate and partially hydrolyzed polyacrylamide, and that polystyrene sodium sulfonate may include materials prepared from used polystyrene resins.

Mixed slurry discharged from a sewage treatment plant (pH 6.8, having an SS concentration of 2.8 wt %, and a COD concentration of 250 ppm) was sample to be used as a test substrate with which to evaluate the performance of the samples. The samples from Example 9 and Comparative Example 5 were separately put into jars containing the test substrate while the substrate being stirred, at a rate of 0.5 wt % for every SS percent. The mixture was left to stand, and the sedimentation rate, turbidity and COD of the supernatant were determined. The results are shown in Table 2.

As a reference, 200 ppm of carbon black was added to the test substrate, and the sample of Comparative Example 5 was added at 0.5 wt % for every SS percent, and the same measurement was undertaken for the resulting mixture. This case was taken as Example 10, and the results are shown under the heading of Table 2.

TABLE 2

|  | Sedimentation rate (m/hour) | Turbidity (ppm) | COD (ppm) |
|---|---|---|---|
| Example 9 | 40 | 21 | 18 |
| Comparative Example 5 | 35 | 49 | 34 |
| Example 10 | 38 | 28 | 23 |

From Table 2 the following finding was obtained. When a mixture including carbon black and an aqueous solution of polymer aggregating agent was added to the test substrate (Example 9), or when the aqueous solution of polymer aggregating agent was added following the addition of carbon black (Example 10), the sewage treatment activity was more enhanced, or more specifically the test substrate became more effectively purified than was possible with the single use of the aqueous solution of polymer aggregating agent not being supplemented with carbon black (Comparative Example 5). From this, it was indicated that a polymer aggregating agent when supplied with carbon black, whether the supply occurs prior to or during treatment, will be greatly improved in its treatment activity towards waste water.

Polymer Aggregating Agents Including a Styrene Polymer of a Comparatively Large Molecular Weight

EXAMPLE 11

The polymer aggregating agent of Example 11 included polystyrene sodium sulfonate (Scientific Polymers Co.) or a sulfonated styrene polymer. In this example polystyrene sodium sulfonate was adjusted to have a molecular weight of $17.5 \times 10^4$.

EXAMPLE 12

The polymer aggregating agent of Example 12 included polystyrene sodium sulfonate (Scientific Polymers Co.) whose molecular weight was $50.0 \times 10^4$.

EXAMPLE 13

The polymer aggregating agent of Example 13 was prepared as follows.

High impact polystyrene (used housing materials for VHS cassette tapes, having a molecular weight of Mw=$17.7 \times 10^4$) was dissolved in 1,2-dichloroethane, to which was added dropwise anhydrous sulfuric acid at 20–25° C. for sulfonation. Then an aqueous solution of sodium hydroxide having the same molar concentration with the anhydrous sulfuric acid was added for neutralization, and the solvent was removed by evaporation, to produce an aqueous solution of polymer aggregating agent. This solution was made the sample of Example 13.

The polymer aggregating agent of Example 13 contains polystyrene sodium sulfonate having a molecular weight of 350,000.

EXAMPLE 14

The polymer aggregating agent of Example 14 was obtained in the same mariner as in Example 13 except that used housing materials of TV were used as high impact polystyrene (Mw=$22.4 \times 10^4$). The polymer aggregating agent of this example contained polystyrene sodium sulfonate whose molecular weight was 450,000.

EXAMPLE 15

The polymer aggregating agent of Example 15 was obtained after a hydrolyzed product of the polyacrylamide portion of an anionic polymer aggregating agent had been added to the polymer aggregating agent of Example 13 at a weight ratio of 1:1.

EXAMPLE 16

The polymer aggregating agent of Example 16 was obtained after the quaternary compound of dimethylaminoethylacrylate with methylchloride as a cationic polymer aggregating agent and the polymer aggregating agent of Example 13 had been introduced into a test substrate in the manner described below for mixture.

EXAMPLE 17

The polymer aggregating agent of Example 17 was obtained after the quaternary compound of dimethylaminoethylacrylate with methylchloride as a cationic polymer aggregating agent and the polymer aggregating agent of Example 15 had been introduced into a test substrate in the manner described below for mixture.

COMPARATIVE EXAMPLE 6

The polymer aggregating agent of Comparative Example 6 consisted of polystyrene sodium sulfonate (Scientific Polymers Co.) having a molecular weight of $7.0 \times 10^4$.

COMPARATIVE EXAMPLE 7

The polymer aggregating agent of Comparative Example 7 consisted of polystyrene sodium sulfonate (Scientific Polymers Co.) having a molecular weight of $120 \times 10^4$.

COMPARATIVE EXAMPLE 8

The polymer aggregating agent of Comparative Example 8 was obtained after the quaternary compound of dimethylaminoethylacrylate with methylchloride as a cationic polymer aggregating agent and the polymer aggregating agent of Comparative Example 6 had been introduced into a test substrate in the manner described below for mixture.

COMPARATIVE EXAMPLE 9

The polymer aggregating agent of Example 14 was obtained after the quaternary compound of dimethylaminoethylacrylate with methylchloride as a cationic polymer aggregating agent and the polymer aggregating agent of Comparative Example 7 had been introduced into a test substrate in the manner described below for mixture Examples 11 to 17 and Comparative Examples 6 to 9 prepared as above were examined for their treatment activity towards waste water as follows.

Determination of Activity

Waste water discharged from an electronic parts manufacturing plant (pH 4.8, and having an SS concentration of 1.2 wt %) was sampled, to which was added 500 ppm of aluminum sulfate. The resulting suspension was made a test substrate with which to evaluate the performance of the samples. Hundred milliliter aliquots (100 ml) of the test substrate were placed in 200 ml volumetric cylinders with a cap. The samples from Examples 11–15 and Comparative Examples 6–7 were separately added to the test substrate to give a concentration of 10.0 ppm. Immediately thereafter the volumetric cylinder was stirred by being turned upside down and returned repeatedly ten times, and allowed to stand. While it was left to stand, the sedimentation rate of suspended particles, the turbidity of the filtrate after sedimentation, and the water content of residual solid (cake) were determined. The results are shown in Table 3.

TABLE 3

|  | Sedimentation rate (m/hour) | Turbidity (ppm) | COD (ppm) |
| --- | --- | --- | --- |
| Example 11 | 20 | 24 | 70 |
| Example 12 | 22 | 28 | 72 |
| Example 13 | 20 | 22 | 73 |
| Example 14 | 22 | 20 | 71 |
| Example 15 | 25 | 20 | 70 |
| Comparative Example 6 | 1 | — | — |
| Comparative Example 7 | 21 | 85 | 76 |

From Table 3 it is obvious that all the samples from Examples 11–15 have a basic property as a polymer aggregating agent, and are far more active in reducing the turbidity of the filtrate after sedimentation than the sample from Comparative Example 7 whose molecular weight is outside the range of 150,000–600,000. This result demonstrates that a polymer aggregating agent which contains a sulfonated styrene polymer as a principal ingredient and has a molecular weight in the range of 150,000–600,000 is greatly improved in its treatment activity towards waste water, especially in its purification of suspensions.

It was also found that the samples of Examples 11–15 are more effective in reducing the water content of dehydrated cakes than those from Comparative Examples 6 and 7 or the polymer aggregating agents with a molecular weight being outside the range of 150,000–600,000. This result demonstrates that a polymer aggregating agent with a molecular weight in the range of 150,000–600,000 is greatly improved in its treatment activity towards waste water, especially in its recovery of purified water from sewage which will be served for reuse.

It was further ascertained that the polymer aggregating agent may include partially hydrolyzed polyacrylamide, and that polystyrene sodium sulfonate may include materials prepared from used polystyrene resins.

Mixed slurry discharged from a sewage treatment plant (pH 6.6, and having an SS concentration of 2.8 wt %) was sampled to be used as a test substrate with which to evaluate the performance of the samples. The samples from Examples 16 and 17, and Comparative Examples 8 and 9 were separately put into jars containing the test substrate while the substrate being stirred. The added amount was so adjusted as to give 0.6 wt % quaternary compound of dimethylaminoethylacrylate with methylchloride for every percent of SS. Then, polystyrene sodium sulfonate specific to Examples 16 and 17 and to Comparative Examples 8 and 9 was added at a ratio of 0.15 wt % to every percent of SS. The mixture, after being stirred, was left to stand, and the sedimentation rate, turbidity of the filtrate after sedimentation, and the water content of cakes were determined. The results are shown in Table 4.

TABLE 4

|  | Sedimentation rate (m/hour) | Turbidity (ppm) | COD (ppm) |
| --- | --- | --- | --- |
| Example 16 | 40 | 21 | 18 |
| Example 17 | 40 | 25 | 70 |
| Comparative Example 8 | 20 | 61 | 76 |
| Comparative Example 9 | 38 | 56 | 78 |

From Table 4 it is obvious that, as with the case for sewage from an electronic parts manufacturing plant, the use of a polymer aggregating agent containing a sulfonated styrene polymer as a principal ingredient and having a molecular weight of 150,000–600,000 is far more active in reducing the turbidity of the filtrate after sedimentation, and in reducing the water content of cake produced after dehydration of the sediment than the samples from Comparative Examples 8 and 9.

It was further ascertained that the polymer aggregating agent may include, in addition, the quaternary compound of dimethylaminoethylacrylate with methylchloride, and that polystyrene sodium sulfonate may include materials prepared from used polystyrene resins.

What is claimed is:

1. A method for treating an aqueous liquid waste containg suspended matters, the method comprising:

producing a polymer aggregating agent by sulfonating a polystyrene resin in the presence of an inorganic pigment to provide a water-soluble polymer aggregating agent;

adding the polymer aggregating agent to the aqueous liquid waste; and aggregating said suspended matters as aggregated matters.

2. The method of claim 1, further comprising:

removing the aggregated matters.

3. The method of claim 2, wherein removing the aggregated matters includes filtering the aggregated matters from the aqueous liquid waste.

4. The method of claim 1 wherein the sulfonate of polystyrene resin has a molecular weight in the range of 150,000 to 600,000.

5. The method of claim 1 wherein the sulfonated polystyrene resin includes at least 40 mol % sulfone group with respect to a total weight of monomer units.

6. The method of claim 1 wherein the sulfonated polystyrene resin is a derivative of a waste material.

7. The method of claim 1, the polymer aggregating agent having a sulfonated polystyrene resin includes a styrene copolymer having at least one of styrene-butadiene, styrene-acrylonitrile, styrene-butadiene-acrylonitrile, styrene-(metha)acrylate, styrene-acrylonitrile-(metha)-acrylate esters, styrene-butadiene-(metha)-acrylate ester, styrene-anhydrous maleate, and styrene-anhydrous itaconic acid.

8. The method of claim 1 wherein the inorganic pigment is selected from the group consisting of carbon black and titanium oxide.

9. The method of claim 1 wherein the polymer aggregating agent includes a resin that is selected from the group consisting of a non-ionic resin, an anionic acrylamide resin, and a cationic resin.

10. A method to treat waste water containing suspended matters, the method comprising:

producing a polymer aggregating agent by sulfonating a polystyrene resin in the presence of an inorganic pigment to provide a water-soluble polymer aggregating agent;

adding the polymer aggregating agent to the waste water;

aggregating said suspended matters as aggregated matters, and removing the aggregated matters.

11. The method of claim 10, wherein removing the aggregated matters includes filtering the aggregated matters from the waste water.

12. The method of claim 11 wherein the sulfonated polystyrene resin has a molecular weight in the range of 150,000 to 600,000.

13. The method of claim 12 wherein the sulfonated of polystyrene resin has at least 40 mol % sulfone group with respect to a total weight of monomer units.

14. The method of claim 11 wherein the sulfonated polystyrene resin is derived from a waste material.

15. The method of claim 14 wherein the sulfonated polystyrene resin includes a styrene copolymer having at least one of styrene-butadiene, styrene-acrylonitrile, styrene-butadiene-acrylonitrile, styrene-(metha)acrylate, styrene-acrylonitrile-(metha)-acrylate esters, styrene-butadiene-(metha)-acrylate ester, styrene-anhydrous maleate, and styrene-anhydrous itaconic acid.

16. The method of claim 10 wherein said inorganic pigment includes at least one of carbon black and titanium oxide.

17. The method of claim 16 wherein said polymer aggregating agent further includes one of a non-ionic resin, an anionic acrylamide resin, and a cationic resin.

* * * * *